United States Patent
Cheung et al.

(10) Patent No.: US 11,754,218 B2
(45) Date of Patent: Sep. 12, 2023

(54) DEVICE MOUNTING BRACKET WITH MULTI-PURPOSE BASE

(71) Applicants: Steven Wai-Tong Cheung, Plainview, NY (US); Sergio Portella DeAlbuquerque, Plainview, NY (US)

(72) Inventors: Steven Wai-Tong Cheung, Plainview, NY (US); Sergio Portella DeAlbuquerque, Plainview, NY (US)

( * ) Notice: Subject to any disclaimer, the term of this patent is extended or adjusted under 35 U.S.C. 154(b) by 391 days.

(21) Appl. No.: 17/212,259

(22) Filed: Mar. 25, 2021

(65) Prior Publication Data
US 2021/0388941 A1 Dec. 16, 2021

Related U.S. Application Data

(60) Provisional application No. 63/037,816, filed on Jun. 11, 2020.

(51) Int. Cl.
| | |
|---|---|
| *F16M 13/02* | (2006.01) |
| *F16C 11/04* | (2006.01) |
| *F16B 9/02* | (2006.01) |

(52) U.S. Cl.
CPC ............... *F16M 13/02* (2013.01); *F16B 9/02* (2013.01); *F16C 11/04* (2013.01)

(58) Field of Classification Search
CPC ...... F16M 13/02; F16M 11/04; F16M 11/041; F16M 11/40; F16M 13/022; F16C 9/02
USPC .................................................... 248/274.1
See application file for complete search history.

(56) References Cited

U.S. PATENT DOCUMENTS

| | | | | |
|---|---|---|---|---|
| 6,938,868 | B2 * | 9/2005 | Pence | F16B 9/054 4/600 |
| 8,113,473 | B2 * | 2/2012 | Bradley | E04H 12/2253 248/545 |
| 8,302,919 | B1 * | 11/2012 | McGrath | F16M 11/24 248/398 |
| 9,395,037 | B2 * | 7/2016 | Ballhatchet | G06F 1/16 |
| 10,533,591 | B2 * | 1/2020 | Guerra | F16B 2/12 |
| 11,473,306 | B2 * | 10/2022 | Nill | F16B 9/02 |
| 2012/0025046 | A1 * | 2/2012 | Yen | F16M 11/045 248/298.1 |

* cited by examiner

*Primary Examiner* — Todd M Epps

(57) ABSTRACT

An apparatus permitting VESA compliant devices to be mounted onto a flat surface, or placed onto a mobile, securable, and rotatable base plate is disclosed. The apparatus consists of a hollow stem with two (2) ends, one which can be affixed to a "VESA mounting plate", with the opposing end affixed onto a flat surface directly flush, onto a base, or other mounting plate. The stem ends and accessory components are engineered to permit fast installation and support for multiple mounting options for on-surface or behind-the-surface mounting, as well as standalone mounting with theft-deterrent features, plus support for add-ons that permit easy lateral rotation of the assembly with cable management.

11 Claims, 19 Drawing Sheets

DEVICE MOUNTING BRACKET WITH MULTI-PURPOSE BASE

RELATED APPLICATIONS

This application claims the benefit of U.S. Provisional Application No. 63/037,816, entitled "Surface VESA bracket with multi-scenario mounting option support," and filed on Jun. 11, 2020, which is incorporated herein by reference in its entirety.

FIELD

Embodiments relate generally to a device mounting bracket, and, more particularly to a device mounting bracket with a multi-purpose base.

BACKGROUND

Typically, VESA ready mounting is featured only on devices such as monitors, televisions, and other large display devices, which allowed these displays to be affixed permanently and securely.

With the advent of compact, PC or tablet-based touch screen controls, interactive displays, and other touch-feedback digital signage, the VESA mounting standards spread to smaller devices, and many dedicated touch panel, tablet enclosures, point-of-sale devices, and other products now feature standard VESA mounting hole patterns.

However, with the rise of low-voltage, VESA-ready display solutions come new challenges, such as being able to power these devices using low voltage wiring, such as but not limited to USB or CAT5 networking cables, both of which can carry both power and data. These setups may incorporate some type of adapter or dongle, which transforms a single low-voltage line into power and data. Hiding, routing, and managing these wires can be a challenge.

Some conventional tablet mounting brackets, such as those in U.S. Pat. No. 9,395,037 B2, generally require a custom-designed enclosure to be kitted along with the mount. This significantly increases the cost of the setup on a per piece basis, as this limitation limits the marketability of the mounting bracket, as it may be incompatible for some non-tablet devices.

Further, if portability of a mounted device or tablet is desired, some conventional mounts in the prior art, such as those in U.S. Pat. No. 9,395,037 B2 or Patent US20120025046A1, may require attachment to a fixed surface, and would be disqualified from consideration as a valid choice if movement and adjustment are needed.

In addition, if a user wishes to install the mounted device or tablet onto a wall, some conventional mounting brackets, such as those in U.S. Pat. No. 9,395,037 B2, may require access to the area 'behind the surface'—so that screws and washer hardware can be installed for a clean, aesthetic look.

Moreover, if the mounted device is for an application where the display needs to be quickly viewable by different users facing each other, some conventional mounting brackets, such as those in U.S. Pat. No. 9,395,037 B2 or Published Patent Application No. US20120025046A1, may be adjustable to show the display at 180° opposing angles, but may subject the mount's multiple moving parts and connectivity wires to repeated rotational and tensional stress that can lead to excessive wear and tear, which will lead to premature breakage and failure over a shorter lifespan, while being clumsy to maneuver for some users.

Therefore, some conventional mounting brackets may not always provide an optimal result, as conventional mounts may result in one deficiency or another. In the case where the device to be mounted is VESA-ready, many mounts are custom made to fit only select tablets or products, making them incompatible with unsupported tablets or non-tablet devices.

In the case of mounting a tablet onto a desk or table setting, some conventional mounting brackets maybe required to be permanently affixed at a single location, with no option for movement outside of the design limits as determined by the length or articulation limitations of the part.

Some conventional mounting brackets permit portability of the setup often lack security mechanisms which prevent unauthorized removal, subjecting the installation to potential theft, or the setup still doesn't permit easy switching of the mounted device's viewing angle between multiple users facing each other at opposing lateral angles.

There exists a need for an improved design which permits the support of the vast array of VESA ready devices, while permitting freedom of movement of the complete assembly when used on a desk or tabletop scenario while supporting quick viewing angle changes, without sacrificing the longevity or security of the setup; as well as support for installation on surfaces where behind-the-surface access is impractical or impossible.

SUMMARY

Some implementations relate to an apparatus that permits a VESA-ready device to be presented at a fixed or adjustable angle for easier viewing. The apparatus can be affixed and mounted on a flat surface by way of screws and washers from 'behind the surface', or directly 'above the surface' via an additional adapter piece. If a portable setup is desired, it can be mounted onto an additional base plate, which can be kitted with an additional part featuring a Kensington lock slot (or other type of lock feature) for security and theft-deterrence. For further adjustability, a rotary add-on piece can be installed to permit quick viewing angle changes by permitting lateral rotation.

In practice, a growing number of displays—ranging from flat-panel monitors, TVs, specialized tablets, or most recently tablet enclosures, are becoming smaller and more personal for interactivity. The problem is now presented, where these devices may need to be placed onto a desktop, countertop, or wall, and be displayed at an angle for easy viewing.

In the same thread, some VESA-ready devices may need to be displayed in a desk or tabletop scenario, where some freedom of movement and limited portability may be desired (e.g., where the device needs to be re-located from time-to-time), but it still needs be secure and be protected from theft. Prior art VESA mounts are generally fixed and permanently mounted in a single location to meet the security requirement or have a limited range of motion restricted by the design of the VESA mount, such as designs with articulating arms or with adjustable brackets (see U.S. Patent Application US20120025046A1 or U.S. Pat. No. 9,395,037 B2). However, these prior art designs may not permit for truly free portability, or the mounting location to be changed without complex, time-intensive removal of mechanical fasteners and subsequent reinstallation. This often prevents users from combining standard VESA-ready devices with prior art VESA bracket designs in many installations, since securing the VESA-ready device prevents it from free movement, while not mounting the VESA-ready device would leave the unit unsecured and vulnerable to unauthorized removal or theft.

Some implementations permit the use of any VESA-ready device to be easily displayed at a fixed or adjustable angle for easier viewing and have a choice of the setup being readily portable, or semi-portable with security & theft-deterrence; or being permanently fixed on a table or countertop; or accessible in a fixed wall location.

In a first aspect of the disclosed subject matter, an apparatus with a hollow stem is disclosed. The hollow center permits cables and other interconnects to be run from the mounted device on one end to the surface that the assembly is mounted to. This permits the wiring to be hidden for a clean, neat look.

In one variant, the hollow stem is manufactured with a fixed angle and does not provide adjustability. This variant, called a fixed angle piece, permits the assembly to present a mounted device at a fixed axial angle.

In another variant, the hollow stem can be manufactured as a flexible coil. This flexible coil is sufficiently adjustable to permit its shape to be contorted when mechanical force is applied by hand without tools but is stiff enough to permit its shape to be retained when left alone or a smaller force is applied, such as poking, prodding, or light tapping on the device by finger. This can be achieved in a number of ways, such as, but not limited to, manufacturing the part as a pre-tensioned coil. This coil is then terminated on both ends of some pre-determined length.

In yet another variant, this hollow stem is symmetrical on both ends, by using the same termination piece. This symmetrical design permits the part to be more easily assembled and lowers the cost of production, since the same termination pieces can be used on both ends of the hollow stem.

In yet another variant, this hollow stem is asymmetrical with respect to both sides, should the termination pieces require them to be manufactured differently for a particular task. In yet another variant, the termination piece on one or both ends can be an adjustable, tilt-able, and/or rotatable joint. This variant permits the assembly to present a mounted device at an adjustable angle.

In yet another variant, the hollow stem's termination pieces feature thru-holes that are concentric to the hollow stem, permitting cabling or other wiring to be inserted into the hollow stem and be fed through the other end, permitting a clean look with hidden wiring.

In yet another variant, this hollow stem can be manufactured with a filled center instead, for applications where cables do not need to be run on the outside, and/or if a filled center is more advantageous then having a hollow center.

In yet another variant, this hollow stem can be manufactured with channels inside of the tube, for optional, preinstalled wiring. These channels or grooves may be application specific to provide, but are not limited to, power, data, audio, video, or other electronic signals.

In a second aspect of the disclosed subject matter, a VESA-compatible mounting plate that can be attached to the termination piece is disclosed. The same screw, rivet, or other mechanical fastening pattern featured on the termination piece is replicated in the center of the VESA compatible mounting plate to permit proper assembly.

In one variant, the VESA-compatible mounting plate can be attached to one end of the hollow stem, on one of the termination pieces using a non-mechanical fastener, such as using chemical bonding agents, epoxies, welding, or other manufacturing methods.

In another variant, the VESA-compatible mounting plate can have a center through hole, so that the connected VESA-ready device can have its cabling run through the apparatus.

In yet another variant, the VESA-compatible mounting plate can have multiple VESA mounting patterns for wide compatibility, such as but not limited to VESA 75×75, 100×100, 200×200, and other standards.

In yet another variant, the VESA-compatible mounting plate can have a metallic coil built in, with leads that can be connected with the optional, preinstalled wiring on the hollow stem. This would provide an option for wireless, inductive charging of the part should a removable or detachable VESA enclosure be selected for use.

In a third aspect of the disclosed subject matter, the apparatus features an optional, removable part that includes a Kensington Lock slot is disclosed. This part can be attached to a termination piece, permitting the entire assembly to be secured onto a Kensington Lock with attached tether.

In one variant, the Kensington Lock slot can be built in as a part of one of the two termination pieces. Depending on project and manufacturing requirements, this may be a more cost-effective option compared to a separate, optional, detachable add-on piece.

In a fourth aspect of the disclosed subject matter, an optional, removable Base Piece which can be connected to the termination piece opposite of the VESA mounting plate is disclosed. This Base Piece permits the apparatus to standalone by itself, without needing additional mechanical, chemical, or other fastening materials or hardware.

In one variant, the Base Piece would replicate the same screw, rivet, or other mechanical fastening pattern, as featured on the termination piece, to ensure proper assembly.

In another variant, the Base Piece can feature screw holes at the bottom of the part, which would permit the assembled apparatus to then be permanently affixed to a fixed location, while preserving a clean aesthetic (e.g., by hiding screw heads and screw holes from view).

In yet another variant, the screw holes at the bottom of the Base Piece may be substituted with, but are not limited to, PEM nuts or embedded, threaded nuts to achieve the same result of permit permitting screws to be installed from the underside of the assembly.

In yet another variant, the Base Piece can be attached to a fix location using a non-mechanical fastener, such as using chemical bonding agents, epoxies, welding, or other assembly or fastening methods.

In yet another variant, the Base Piece can be attached to the end of the hollow stem, on one of the termination pieces using a non-mechanical fastener, such as using chemical bonding agents, epoxies, welding, or other manufacturing methods.

In yet another variant, the Base Piece would feature an additional slot near the area where the termination piece is mounted, to permit cables to pass from the hollow center of the Stem onto the top of the base plate, so that the cables are not crushed. The slot can also be sized such that heavy-duty bolts, screws, or other mechanical fasteners can be used to permanently mount the assembly into a fixed location securely.

In a fifth aspect of the disclosed subject matter, an optional, removable rotary add-on piece is disclosed. The screw hole pattern of the rotary add-on assembly may have a geometry matching both the termination piece opposite of the VESA mounting plate and the base piece. This special geometry permits the rotary add-on to be affixed through the Base Piece and into the termination piece opposite of the VESA mounting plate using screws, rivets, or other mechanical fasteners. This rotary add-on piece permits the apparatus to be laterally rotatable; permitting the entire VESA mounted assembly to be displayed at different angles by adjusting only one (1) moving part.

In one variant, the fastening method used between the rotary add-on piece, base piece, and termination piece may be a non-mechanical method, such as using chemical bonding agents, epoxies, welding, or other manufacturing methods.

In another variant, the rotary add-on piece can be manufactured as two parts rotating with respect to each other, or it can be made of an assemblage of multiple parts.

In yet another variant, the rotary add-on assembly can feature a mechanical stop that prevents lateral rotation of more than 360°, and limits rotation to less than 1 full turn. This helps prevent damage to cables or wires inserted into the hollow stem due to excessive twisting.

In yet another variant, the rotary add-on piece can also feature a mechanical stop that can be assembled to prevent rotation altogether, should this feature be no longer required in a particular setup.

In yet another variant, the rotary add-on piece may be integrated into and manufactured as a part of the Base Piece if so desired.

In yet another variant, the rotary add-on piece may be affixed onto a mounting surface by way of fasteners and matching slots or other accommodations built into the add-on piece's design, or another a non-mechanical method, such as using chemical bonding agents, epoxies, welding, or other manufacturing methods.

In yet another variant, the rotary add-on piece can feature an additional wire management piece which guides wires coming out of the hollow stem's thru-hole to only exit at the center of the base. Without the wire management piece, wires would exit at a location with a radial distance away from the center, and thus, this location would constantly be in motion as the rotary add-on piece spins. This creates excess wear-and-tear on the wire jackets and causes long-term cable damage. By forcing the cable to only exit out the center of the base, the cable exit location no longer moves as the part spins, minimizing & eliminating unnecessary cable motion to prevent cables from being twisted and damaged.

In yet another variant, the wire management piece may be integrated into and manufactured as a part of the rotary add-on piece if so desired.

In yet another variant, the rotary add-on piece can feature screw holes at the bottom of the part, which would permit the assembled apparatus to then be permanently affixed to a fixed location, while preserving a clean aesthetic (e.g., by hiding screw heads and screw holes from view).

In yet another variant, the screws screw holes at the bottom of the rotary add-on piece may be substituted with, but are not limited to, PEM nuts or embedded, threaded nuts to achieve the same result of permit permitting screws to be installed from the underside of the assembly.

In yet another variant, the rotary add-on piece can be attached to a fix location using a non-mechanical fastener, such as using chemical bonding agents, epoxies, welding, or other assembly or fastening methods.

In a sixth aspect of the disclosed subject matter, a cover cap which matches the perimeter shape and dimensions of the Base Piece or rotary add-on piece is disclosed. The design permits the cover cap to create a void space between the Base Piece/rotary add-on piece and the inside top of the cover cap, permitting peripherals such as, but not limited to, battery charging packs, data connectivity hubs, cables, and other interconnects, to be hidden neatly within the apparatus for a clean, aesthetic look with completely hidden wiring.

In one variant, the cover cap may simply be left loose and easily removable from the Base Piece/rotary add-on piece.

In another variant, the cover cap may incorporate magnets which are placed in the cover cap such that it permits direct contact to a ferrous-based base plate/rotary add-on piece, preventing unintended motion if the cover cap was nudged or gently moved. However, the design would still permit for the part to be disassembled when the cover cap is lifted up and removed by force, thus permitting direct access to the top of the base plate.

In yet another variant, the cover cap may incorporate threaded holes which match up with screws installed through the Base Piece/rotary add-on piece, preventing unauthorized cover cap removal.

In yet another variant, the cover cap may incorporate a chemical or other non-mechanical bonding mechanism, such as but not limited to, glues, epoxies, or welding which prevents the cover cap from being removed from the base plate.

In yet another variant, the cover cap may be built into the Base Piece or rotary add-on piece, with the void space formed in the center of the part without the use of an additional, separate part. Additional channels/wiring guides may also be integrated into the Base Piece/rotary add-on piece to permit cables to run from the integrated void space into the hollow stem.

In a seventh aspect of the disclosed subject matter, an optional adapter bracket is disclosed. This adapter bracket would replace the Base Piece/rotary add-on piece mentioned above, for installations where a permanent, fixed mounting location is desired.

In one variant, this part can permit the hollow stem and VESA Plate assembly to be mounted directly onto any flat surface from "behind-the-surface"—i.e., where an installer has access to the space behind the mounting surface—such as from underneath a desk or a tabletop. In this instance, the part would act as a washer, evenly distributing the clamping force applied onto the bottom of the mounting surface from the fastening hardware.

In another variant, the optional adapter bracket would be utilized for "on-surface" mounting, where installers do not have access to the area behind the mounting surface, such as a wall. In this case, the adapter bracket installs directly onto one of the termination pieces opposite the VESA-ready Plate, using screws, rivets, or other mechanical fasteners. The adapter bracket would then act as an additional flange on the assembly, permitting it to then be assembled onto any flat surface using an additional set of screws, rivets, or other mechanical fasteners.

In yet another variant, to save on the production costs for multiple, specialized parts, the optional adapter bracket can be made to support both "behind-the-surface" and "on-surface" mounting—permitting a single piece to serve a multitude of purposes.

In yet another variant, the fastening method used between the termination piece, adapter bracket, and flat surface may be a non-mechanical method, such as using chemical bonding agents, epoxies, welding, or other manufacturing methods.

In yet another variant, the optional adapter bracket may be simply replaced by use of a series of screws with large washers. This alternative design could be used in cases where a lower cost option is required, as washers are inexpensive while an additional, optional adapter bracket will bear additional manufacturing costs.

BRIEF DESCRIPTION

DETAILED DESCRIPTION

The term "VESA" refers to the VESA Mounting Interface Standard or colloquially as VESA Mount, which is a family of standards defined by the Video Electronics Standards Association for mounting flat panel monitors, TVs, and other displays to stands or wall mounts. It is implemented on devices such as, but not limited to, most modern flat panel monitors, TVs, and some specialized tablets designed for mounting.

The term "flush" or "flush mount" refers to attaching two parts or components together with little to no gap between the two. This is usually done to achieve a clean, aesthetic look.

The term "Kensington Slot" refers to a Kensington Security Slot, which is a part of an anti-theft system designed and patented by Kryptonite in 1999-2000 with U.S. Pat. Nos. 6,081,974, 6,317,936, and 6,360,405; where a Kensington lock can be installed.

Those of ordinary skill in the art will realize that the following detailed description of the disclosed subject matter is illustrative only and is not intended to be in any way limiting. Other embodiments of the disclosed subject matter will readily suggest themselves to such skilled persons having the benefit of this disclosure. Reference will now be made in detail to implementations of the disclosed subject matter as illustrated in the accompanying drawings. The same reference indicators will be used throughout the drawings and the following detailed description to refer to the same or like parts.

Figure 1:
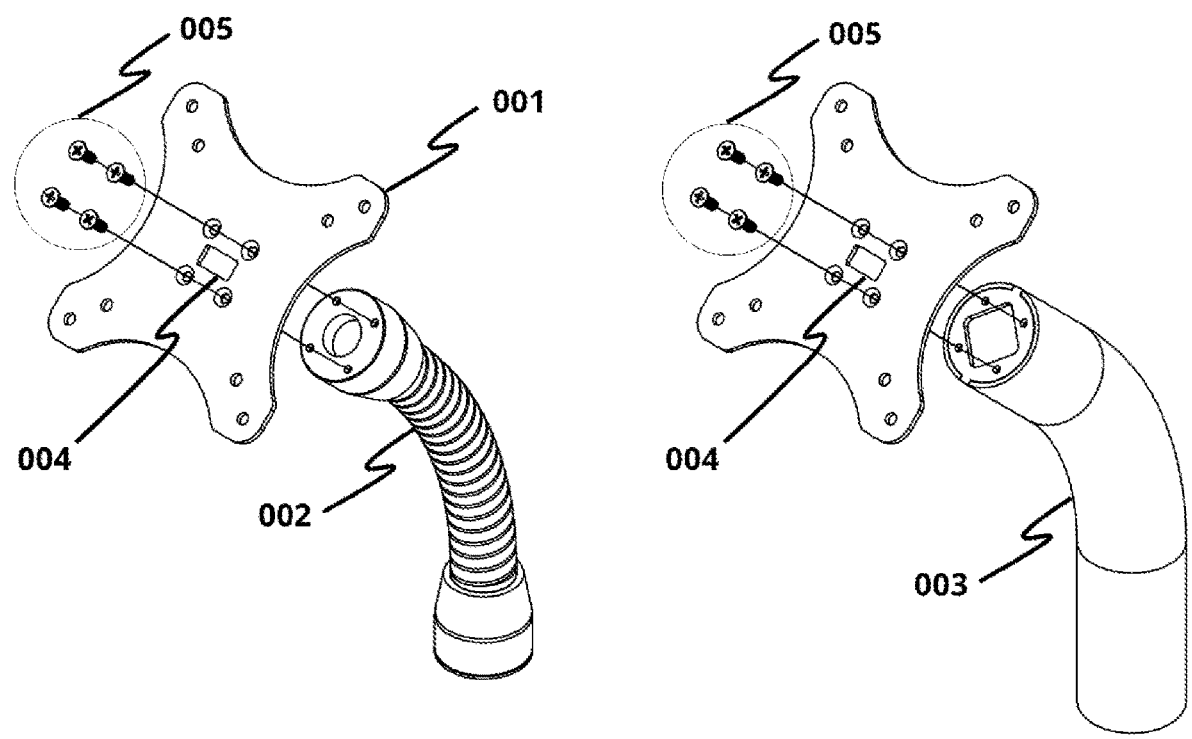
FIG. 1 is a diagram showing exploded, unassembled views of example surface bracket supports, one with a flexible coil and one with a fixed angle, both featuring a hollow center column in accordance with some implementations.

FIG. 1 demonstrates the core components, with the VESA Plate (001) and a flexible coil piece (002) as the hollow stem; or a VESA Plate (001) and a fixed angle piece (003) as the hollow stem, both in an exploded, unassembled view. The VESA Plate has a slot (004) in the center that permits cables to pass through the hollow stem's center column and is assembled together via a set of screws (005).

Figure 2:
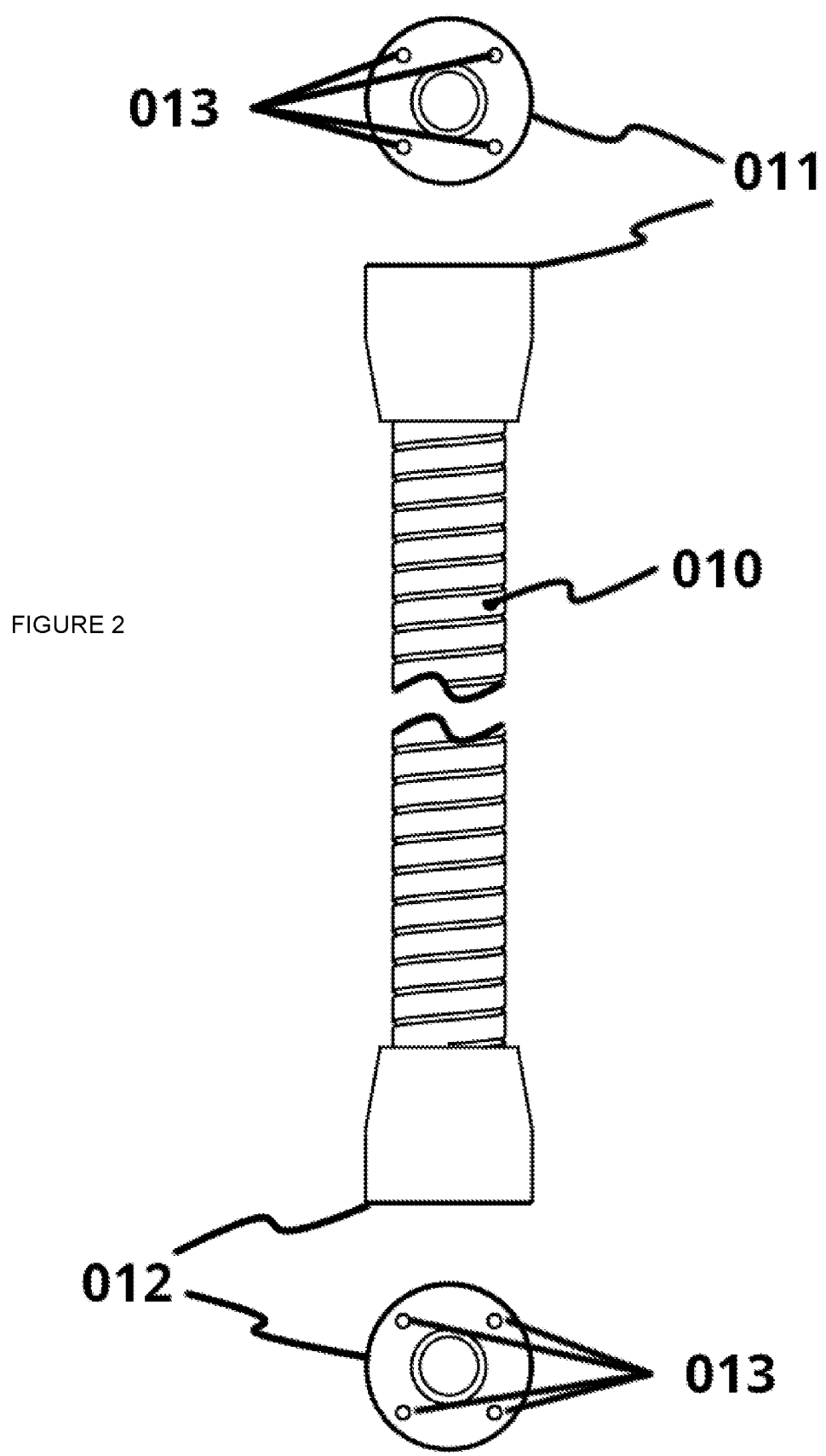
FIG. 2 is a diagram showing orthogonal views of the ends of a flexible coil piece of an example hollow center column in accordance with some implementations.

FIG. 2 shows orthogonal views of both ends of the flexible coil piece (010) as the hollow stem. As illustrated, both ends of the flexible coil piece (011, 012) are designed to be the same in terms of dimensions and threaded hole patterns (013). This permitting for easier manufacturing, which drives down cost of production.

Figure 3:
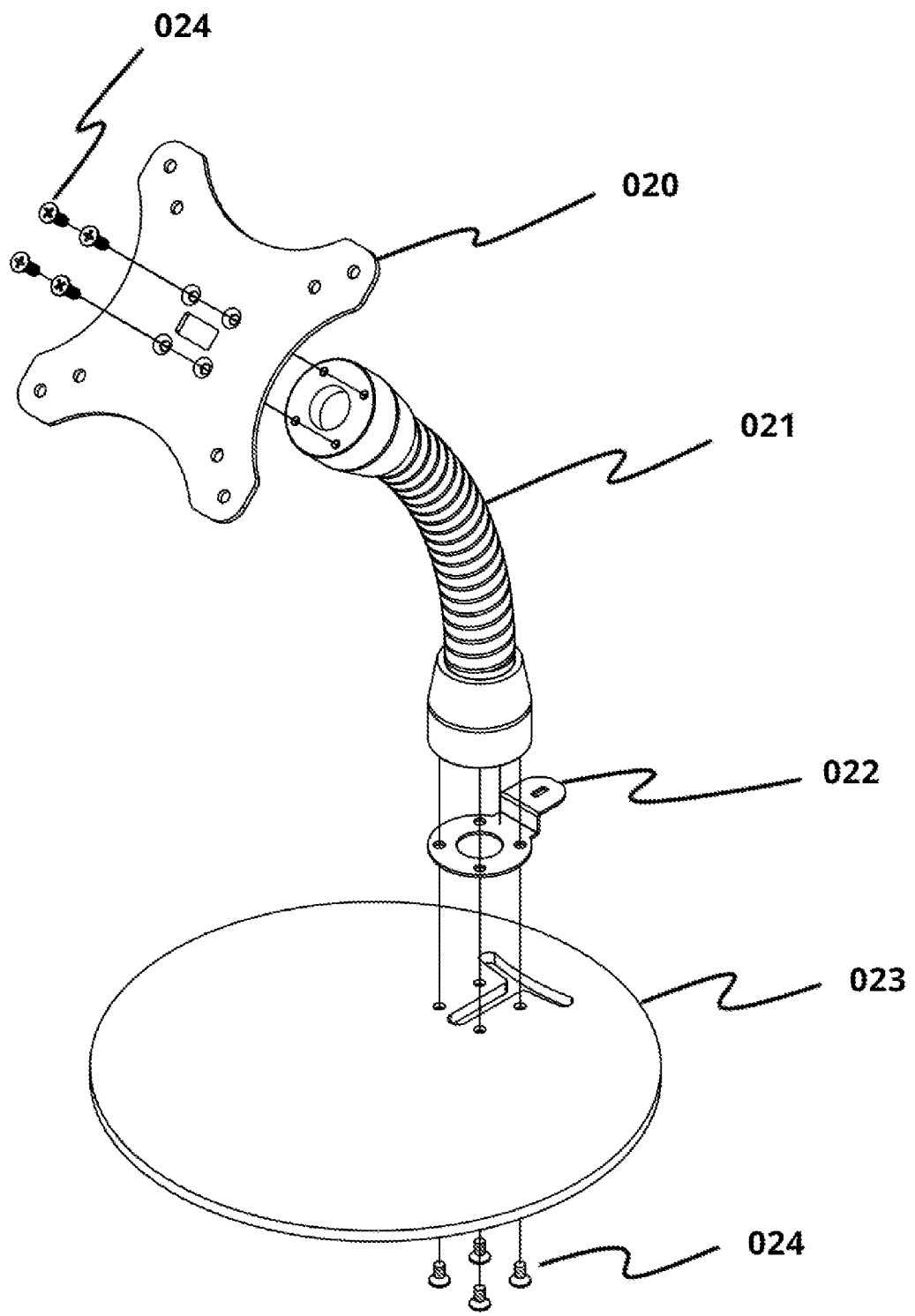
FIG. 3 is a diagram showing an exploded view of an example surface bracket support in accordance with some implementations.

FIG. 3 shows the VESA Plate (020) assembled onto the flexible coil piece (021) as the hollow stem, which is then affixed on top of an additional part which has a Kensington Lock slot (022) built in, and a base plate (023), in an exploded, unassembled view. This assembly is held together by a series of screws (024) in this illustration.

Figure 4:
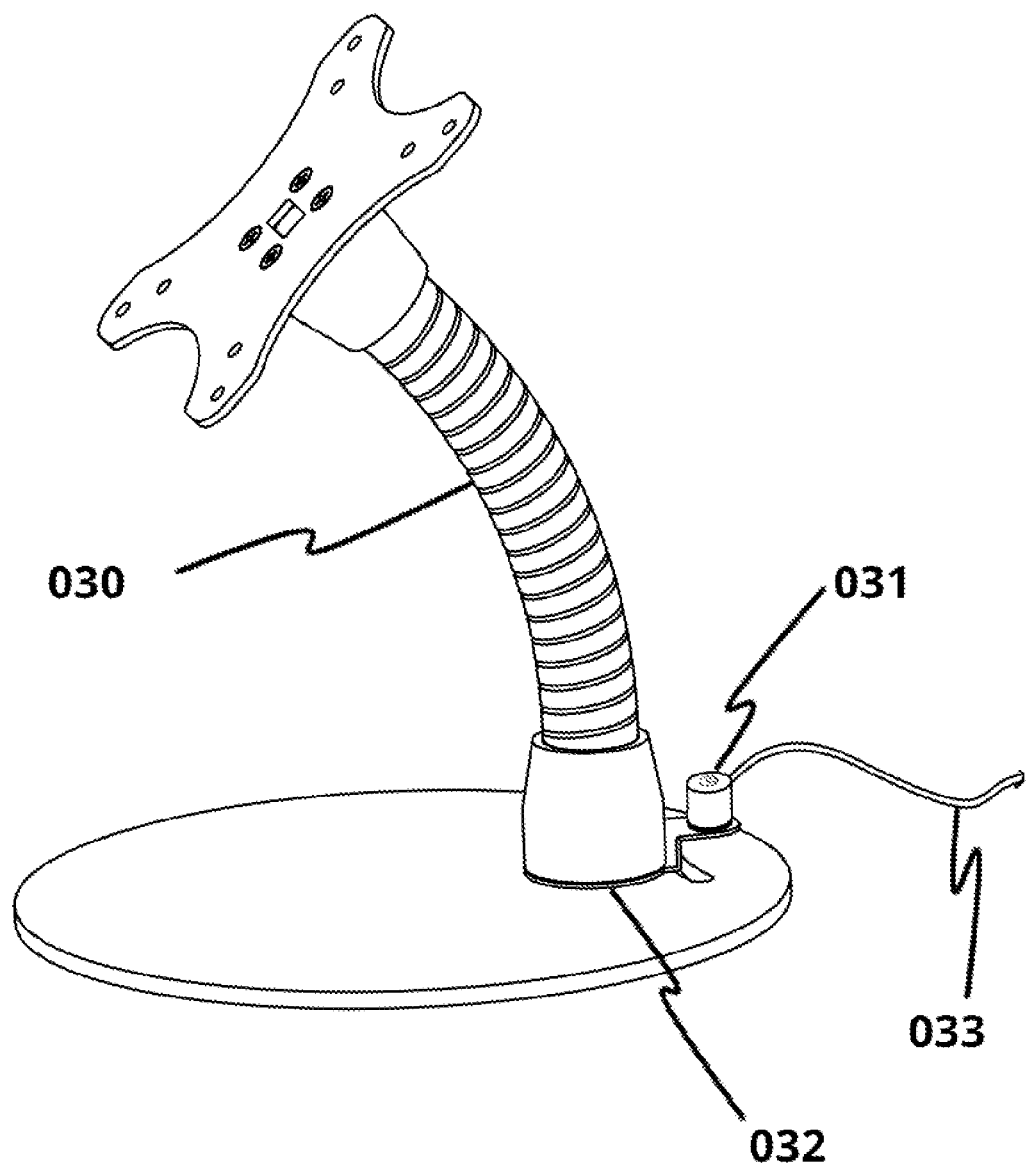
FIG. 4 is a diagram showing aside perspective view of an example surface bracket support assembled with a Kensington Lock in accordance with some implementations.

FIG. 4 shows the completed assembly (030), with a Kensington Lock (031) installed into the Kensington Slot piece (032). The Kensington Lock's security tether (033) is affixed and secured to prevent unauthorized removal.

Figure 5:
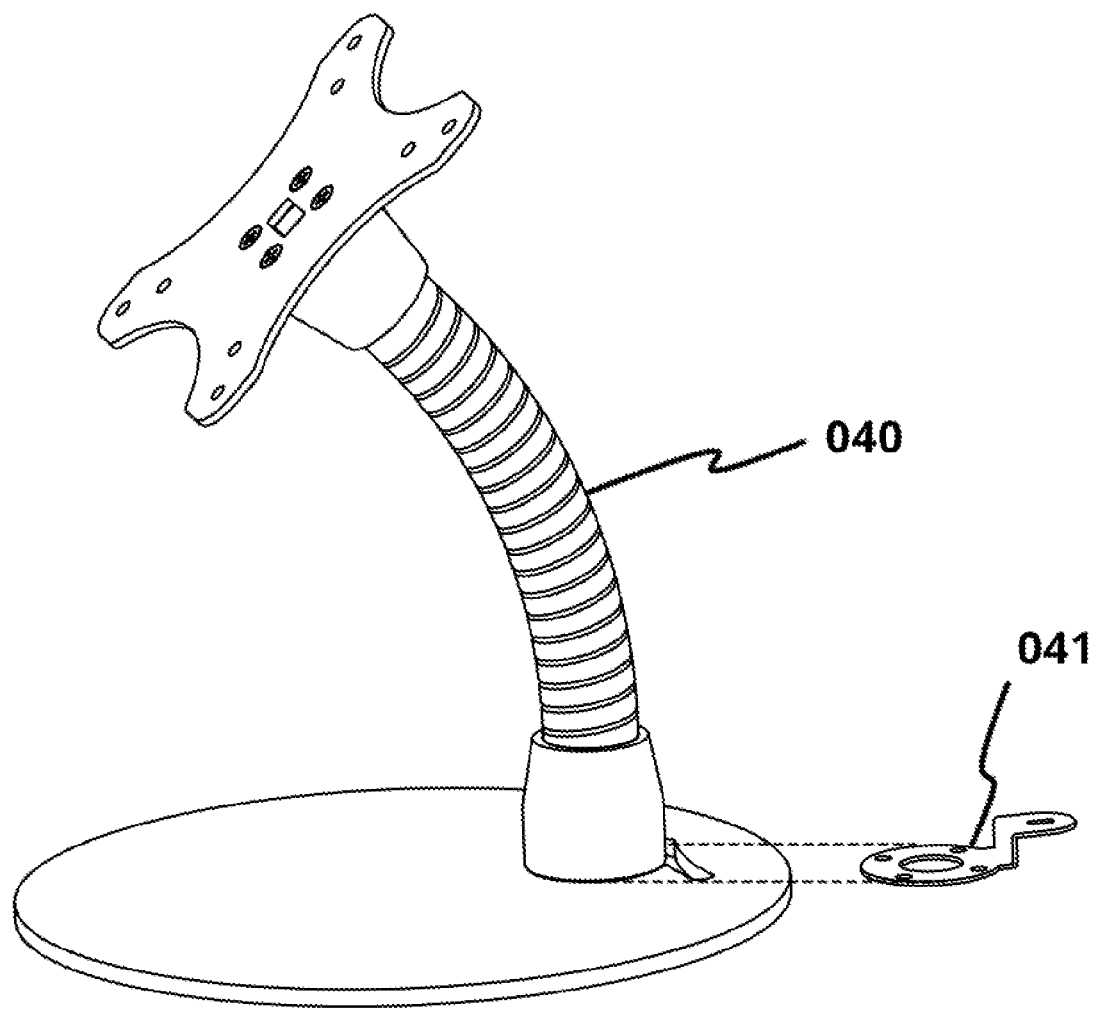
FIG. 5 is a diagram showing aside perspective view of an example surface bracket support with an add-on Kensington Lock piece removed from the assembly in accordance with some implementations.

FIG. 5 shows the same assembly (040), with the optional part which provides a Kensington Lock hole (041) removed from the assembly. This permits the apparatus to operate in a standalone capacity, making it ideal for truly portable setups with fully unrestricted freedom of movement.

Figure 6:
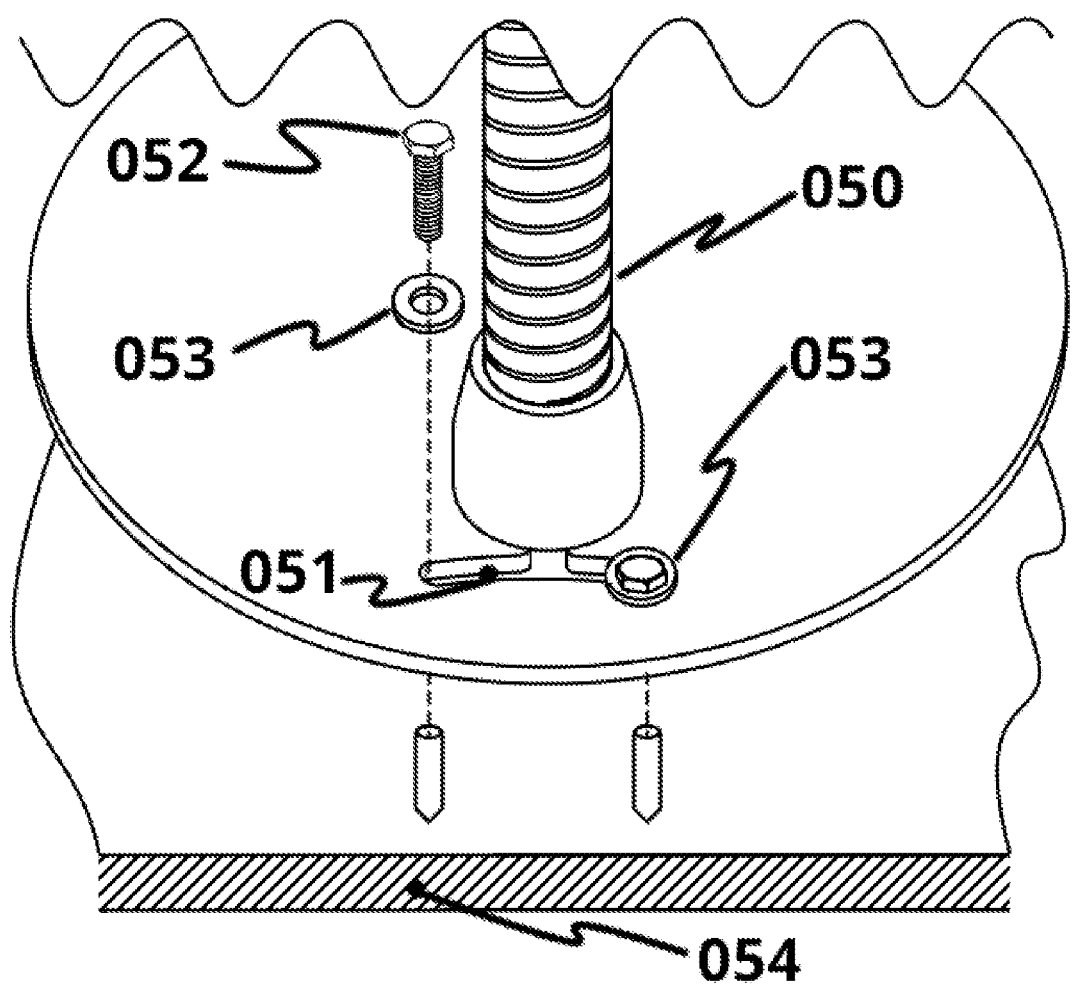
FIG. 6 is a diagram showing a detailed view of a slot at the bottom base plate of an example surface bracket support in accordance with some implementations.

FIG. 6 shows the same assembly (050), with a focus on a semi-circular slot at the bottom base plate (051). This shows how the assembly can be permanently affixed to a single location using large bolts (052) and optional washers (053)

into any surface (054). This is ideal for public setups where larger bolts would be a preferred choice for more secure mounting.

Figure 7:
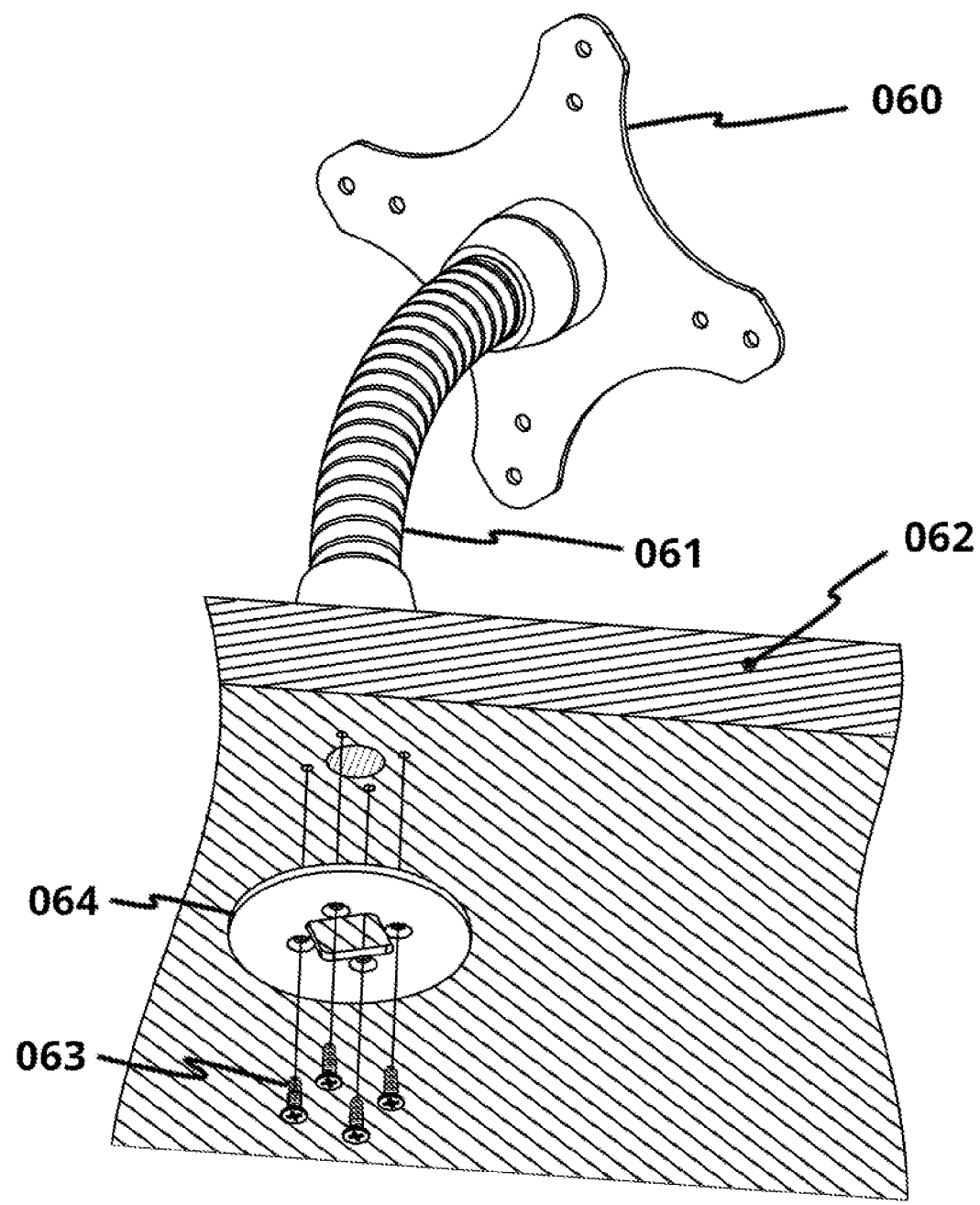
FIG. 7 is a diagram showing a bottom perspective view of an optional adapter bracket of an example surface bracket support in accordance with some implementations.

FIG. 7 shows the same assembly with the VESA Plate (060) and flexible coil piece (061) as the hollow stem, but now directly affixed onto a flat mounting surface (062) by way of a set of screws (063) and an optional adapter bracket (064) installed into the assembly, from behind the mounting surface (062). The optional adapter bracket acts as a washer to evenly distribute the mounting force applied from the fasteners onto the mounting surface. This illustrates a common desk or a tabletop setup, where an installer has easy access to the area behind the mounting surface or desktop.

Figure 8:
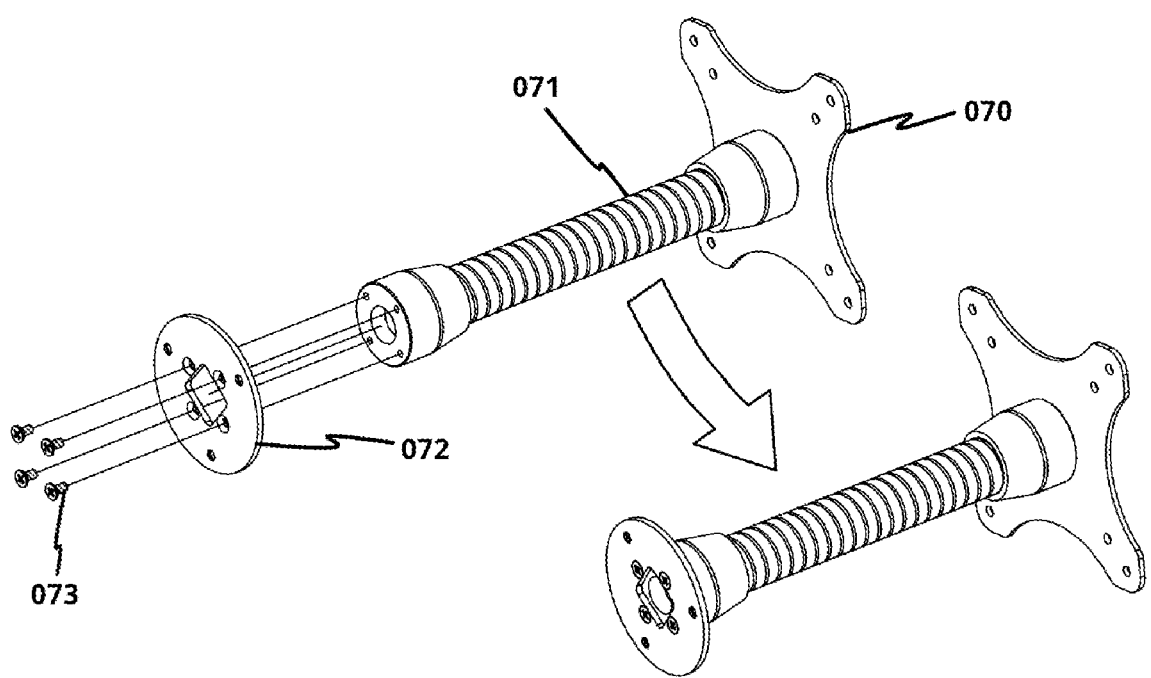
FIG. 8 is a diagram showing an exploded view of an optional adapter bracket of an example surface bracket support in accordance with some implementations.

FIG. 8 shows an exploded, unassembled view of the VESA Plate (070) assembled onto the flexible coil piece (071) as the hollow stem, which is then affixed onto an optional adapter bracket (072) by way of a set of screws (073) installed into the assembly.

Figure 9:
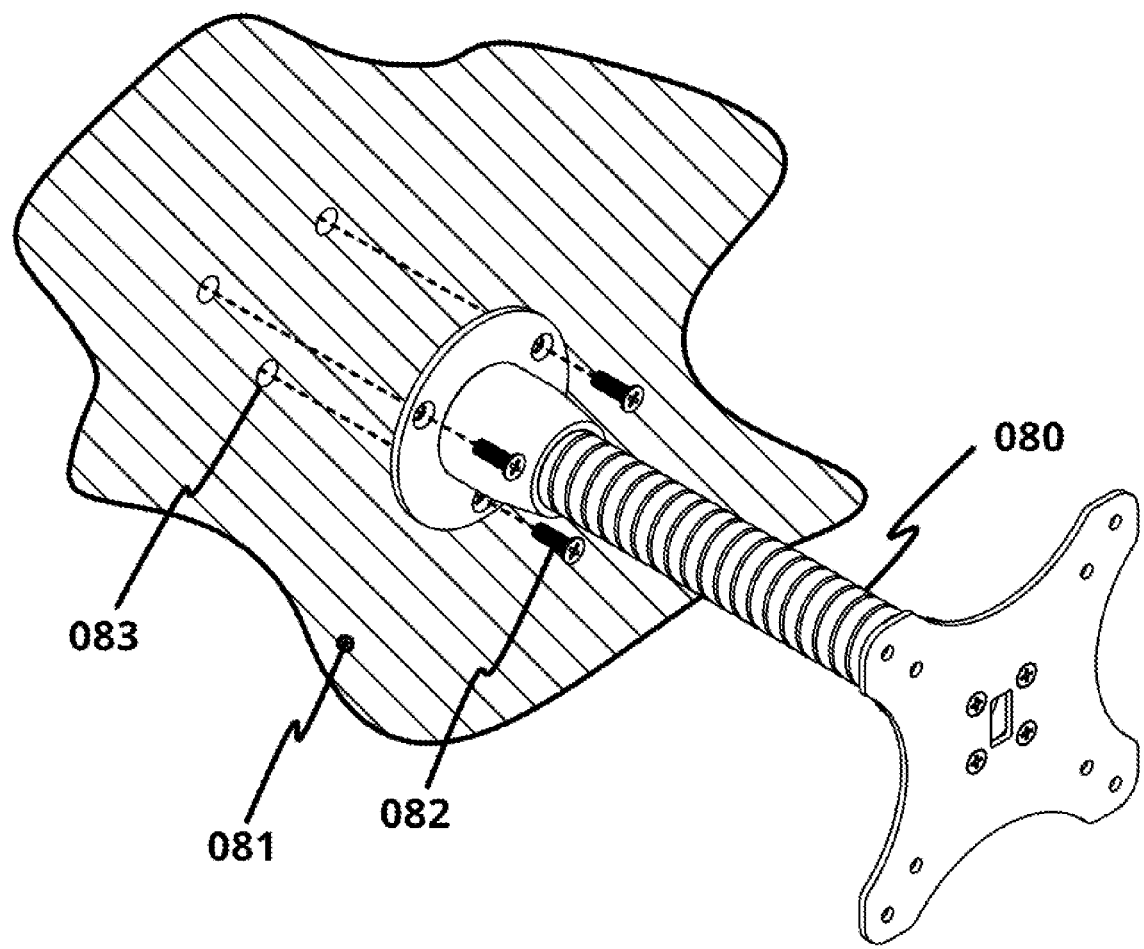
FIG. 9 is a diagram showing a perspective view of an example surface bracket support with an optional adapter bracket being installed in accordance with some implementations.

FIG. 9 shows the entire assembly (080) now mountable onto a surface (081) with yet another set of screws (082), without needing access to the area behind the mounting surface. This illustrates a common wall setup, where wall anchors (083) can be used on the mounting surface, as there is usually no access to the area behind the mounting surface.

Figure 10:
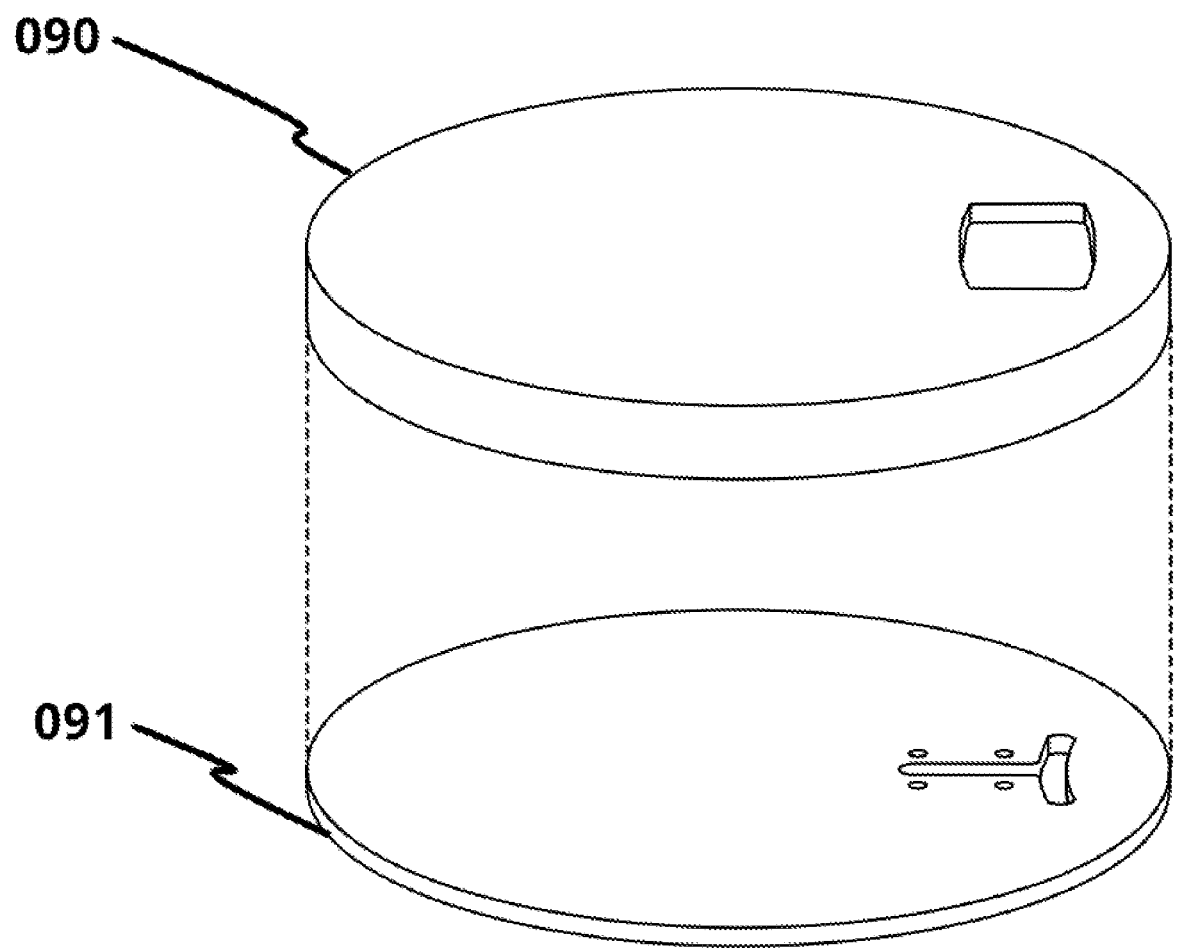
FIG. 10 is a diagram showing an exploded view of an optional base plate cover cap of an example surface bracket support in accordance with some implementations.

FIG. 10 shows a cover cap (090), which is dimensioned to match the outer dimensions of the Base Piece (091) in size and shape.

Figure 11:
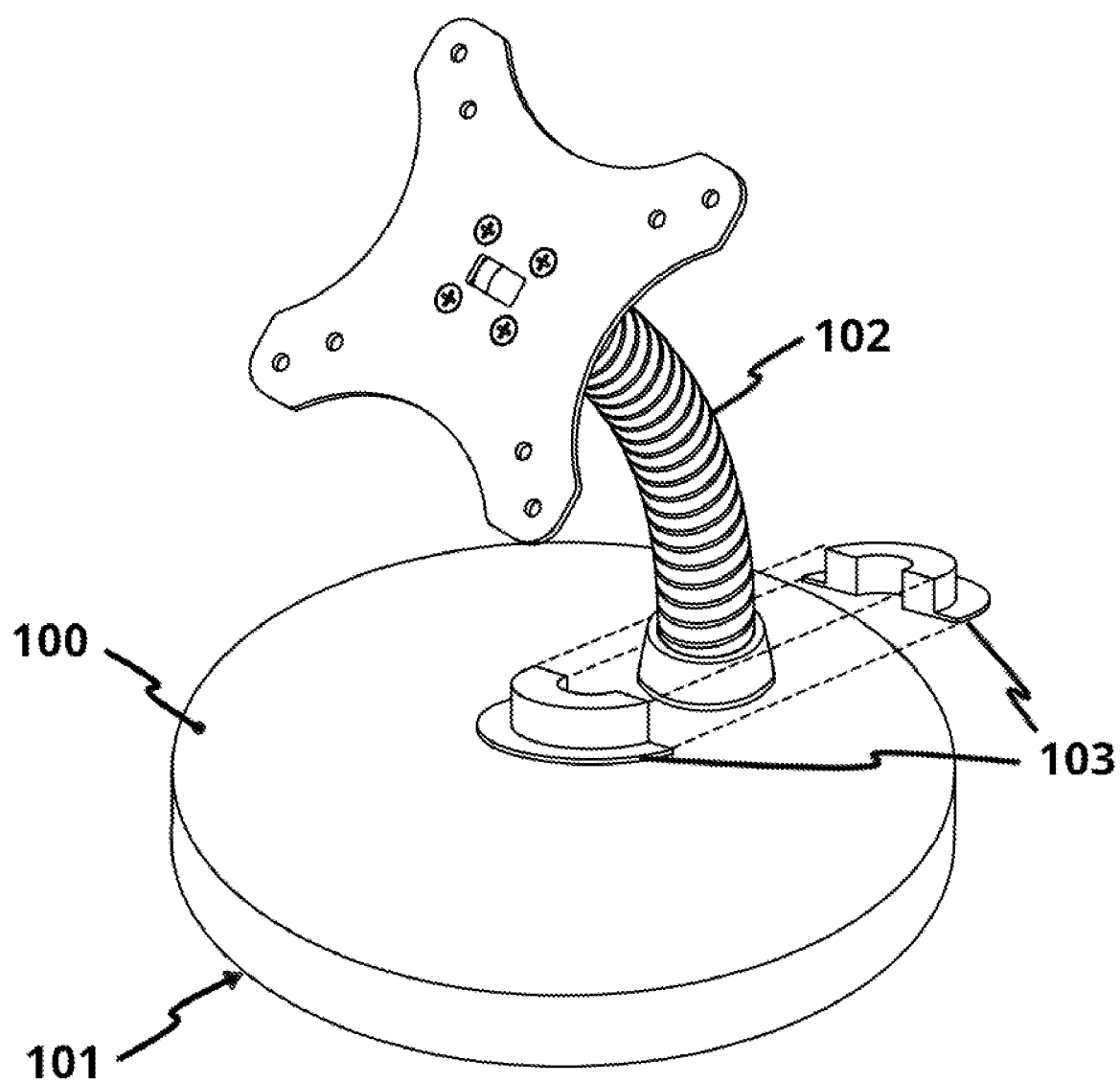
FIG. 11 is a diagram showing a perspective view of an example surface bracket support with optional base plate cover cap having a custom-shaped grommet being installed in accordance with some implementations.

FIG. 11 shows the cover cap (100) placed onto the assembly of the Base Piece (101) and flexible coil piece (102) as the hollow stem. An additional, custom-shaped grommet (103), shown as, but not limited to, one or more pieces, or as an elastomeric piece, which may be added for enhanced aesthetics.

Figure 12:
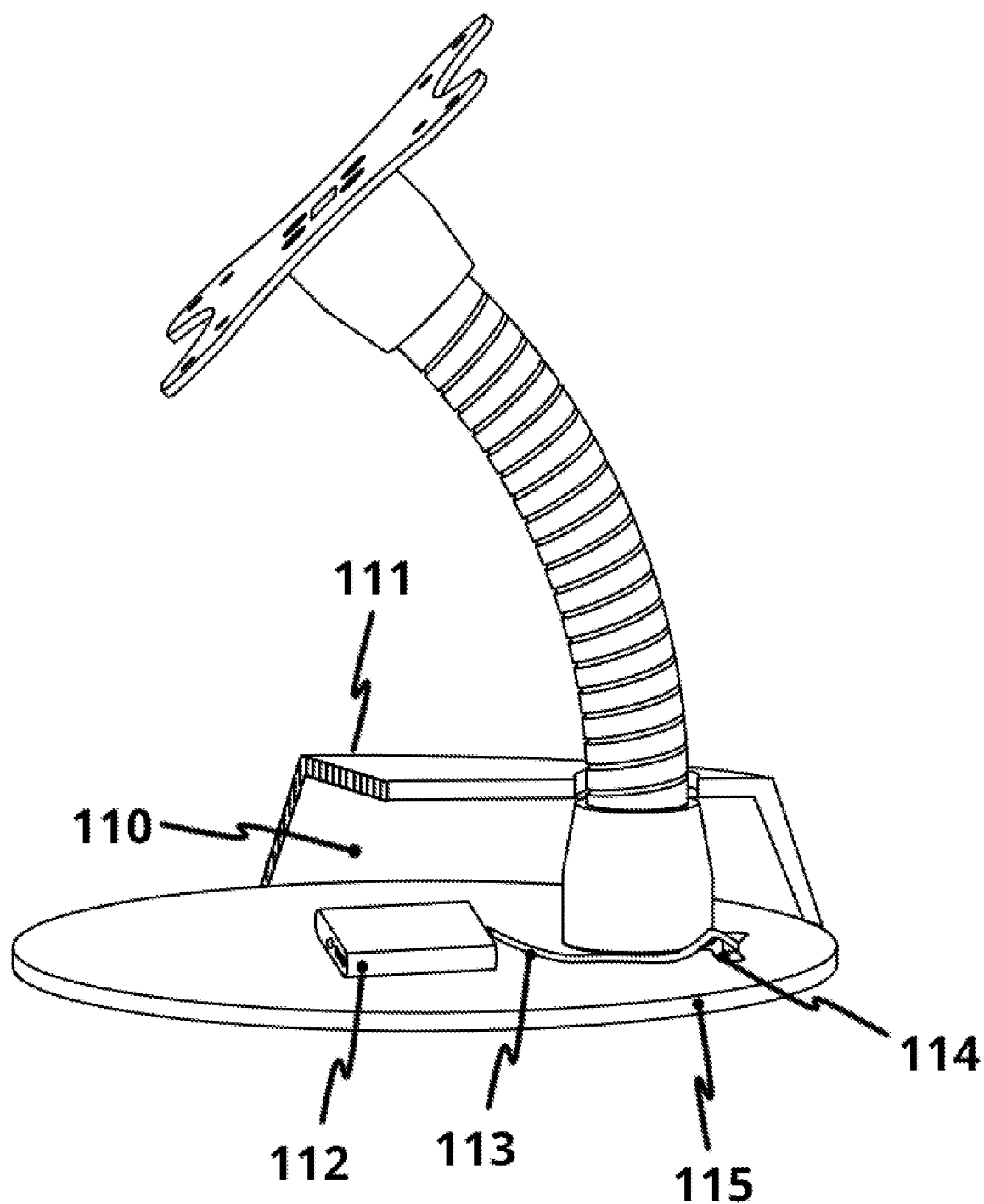
FIG. 12 is a diagram showing a cut through view of an example surface bracket support with void space created by optional base plate cover cap in accordance with some implementations.

FIG. 12 shows the covered void space (110) now created by the cover cap (111) piece, which permits add-ons such as battery packs (112), cables (113), and other power and charging connectivity hardware to be hidden inside. Wiring (113) can be run through the Base Piece by way of the curved slot (114) on the Base Piece (115).

Figure 13:
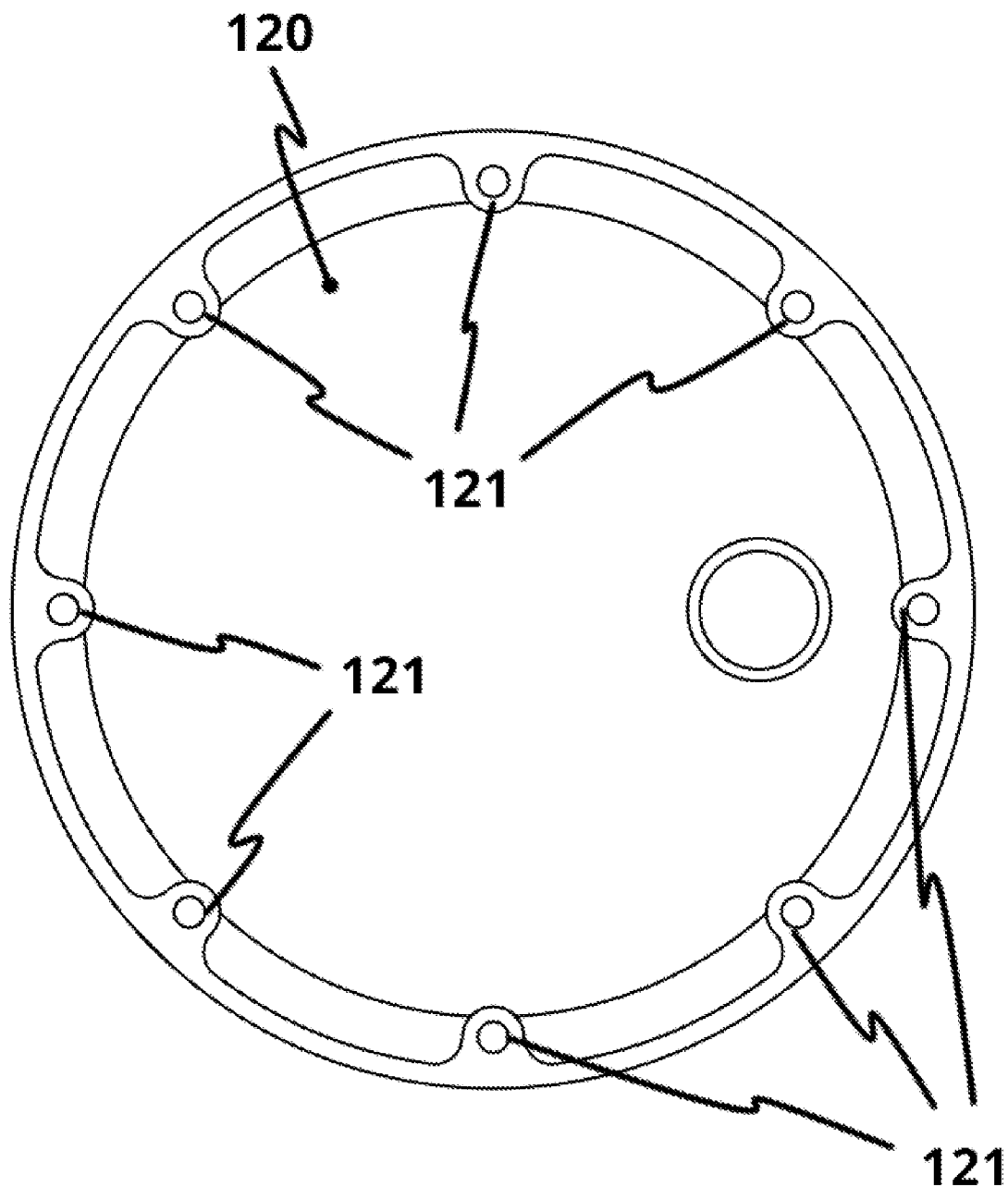
FIG. 13 is a diagram showing a bottom view of an example cover cap in accordance with some implementations.

FIG. 13 shows the underside of the cover cap (120), which can be adhered onto the Base Piece and Flexible Stem as the hollow coil assembly by way of magnets (121) installed on the periphery of the cover cap. Other methods can be used, such as, but not limited to, adhesive tapes and other bonding agents or mechanical fastening methods.

Figure 14:
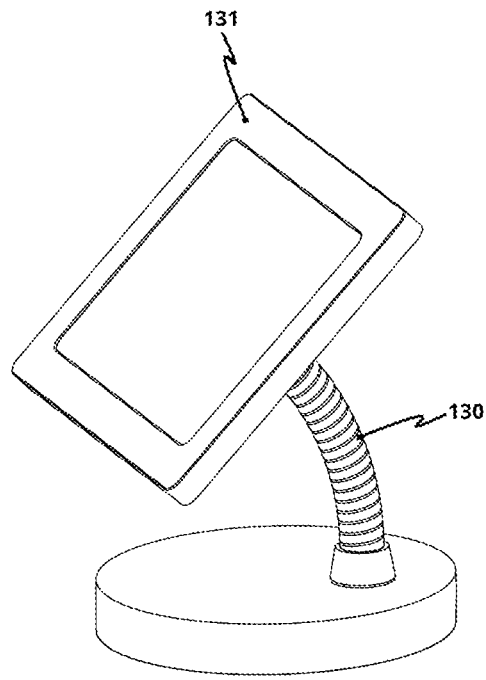
FIGS. 14-19 are diagrams showing various mounting options of example surface bracket supports in accordance with some implementations.
Figure 15:
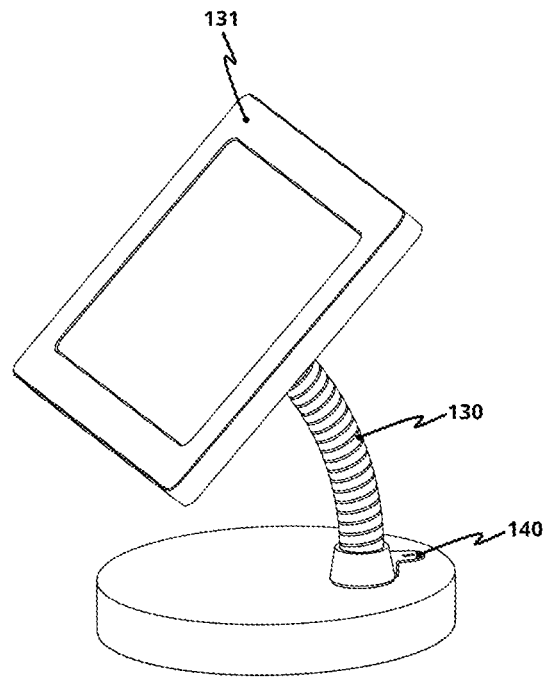
Figure 16:
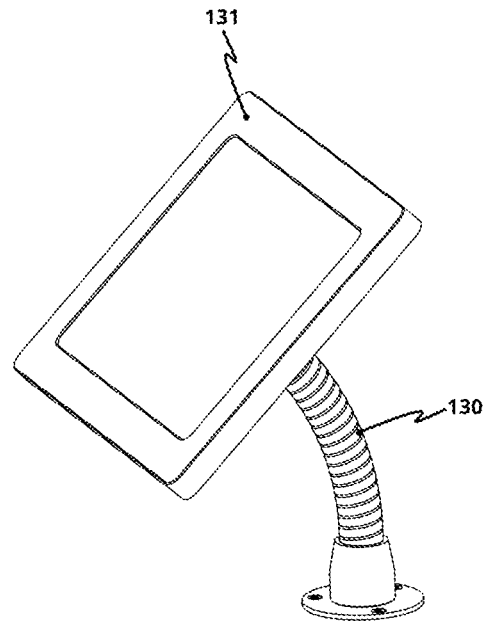
Figure 17:
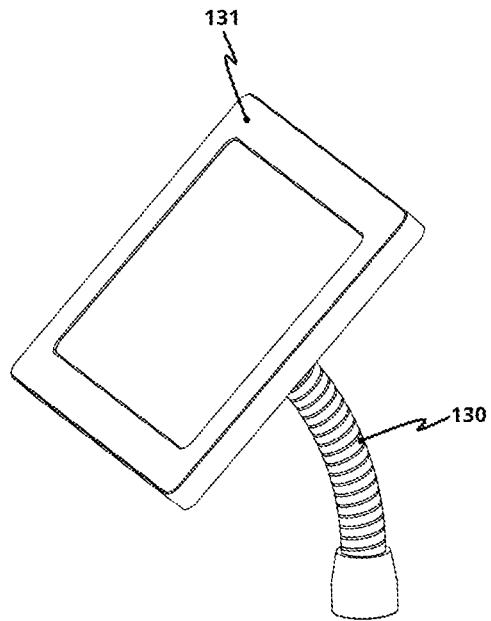
Figure 18:
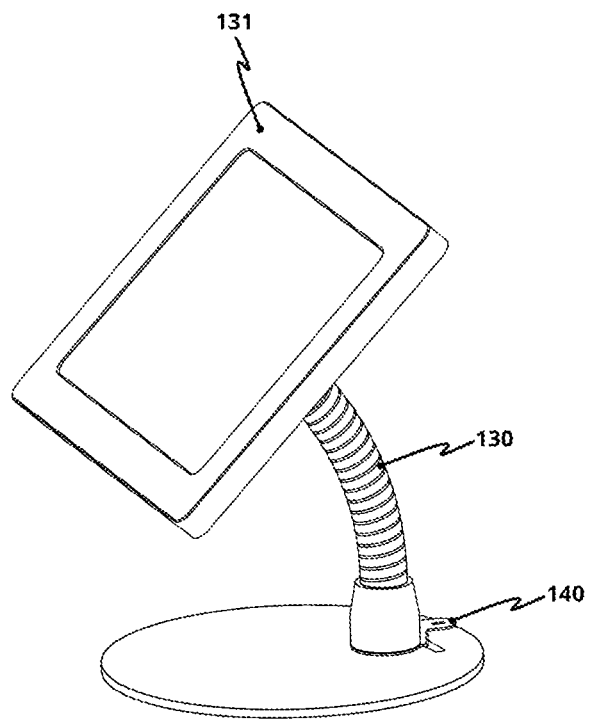
Figure 19:
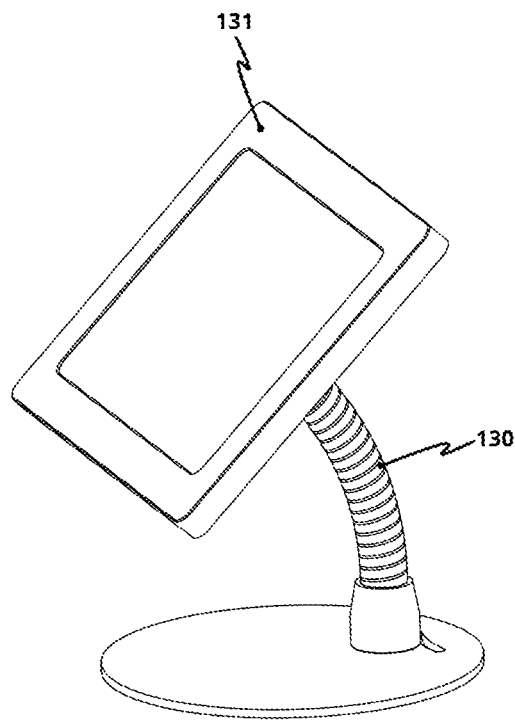

FIGS. 14, 15, 16, 17, 18, and 19 show some implementations provides multiple options and permits easy installation of the assembly onto virtually any mounting surface. FIG. 14 shows a Flexible Stem mounted onto a Base Piece with cover cap. FIG. 15 also shows a Flexible Stem mounted onto a Base Piece with cover cap but has an added Kensington Slot (140) piece. FIG. 16 shows the Flexible Stem permanently affixed to a single, fixed location via on-surface mounting. FIG. 17 shows the Flexible Stem permanently affixed to a single, fixed location, but from behind-the-surface. FIG. 18 shows a Flexible Stem mounted onto a plain Base Piece but has an added Kensington Slot piece. FIG. 19 also shows a Flexible Stem mounted onto a plain Base Piece. However, using the provided holes and affixing the apparatus onto a flat surface is not a requirement. In some desktop/tablet setups where full freedom of movement is desired, the assembly (130) and its mounted VESA-ready device (131) can be left loose and unmounted, as shown in FIGS. 14, 15, 18, and 19. Alternatively, to protect against unauthorized removal, the entire assembly can be secured by making use of the Kensington Lock Slot piece (140) as illustrated in FIG. 15 and FIG. 18.

Figure 20:
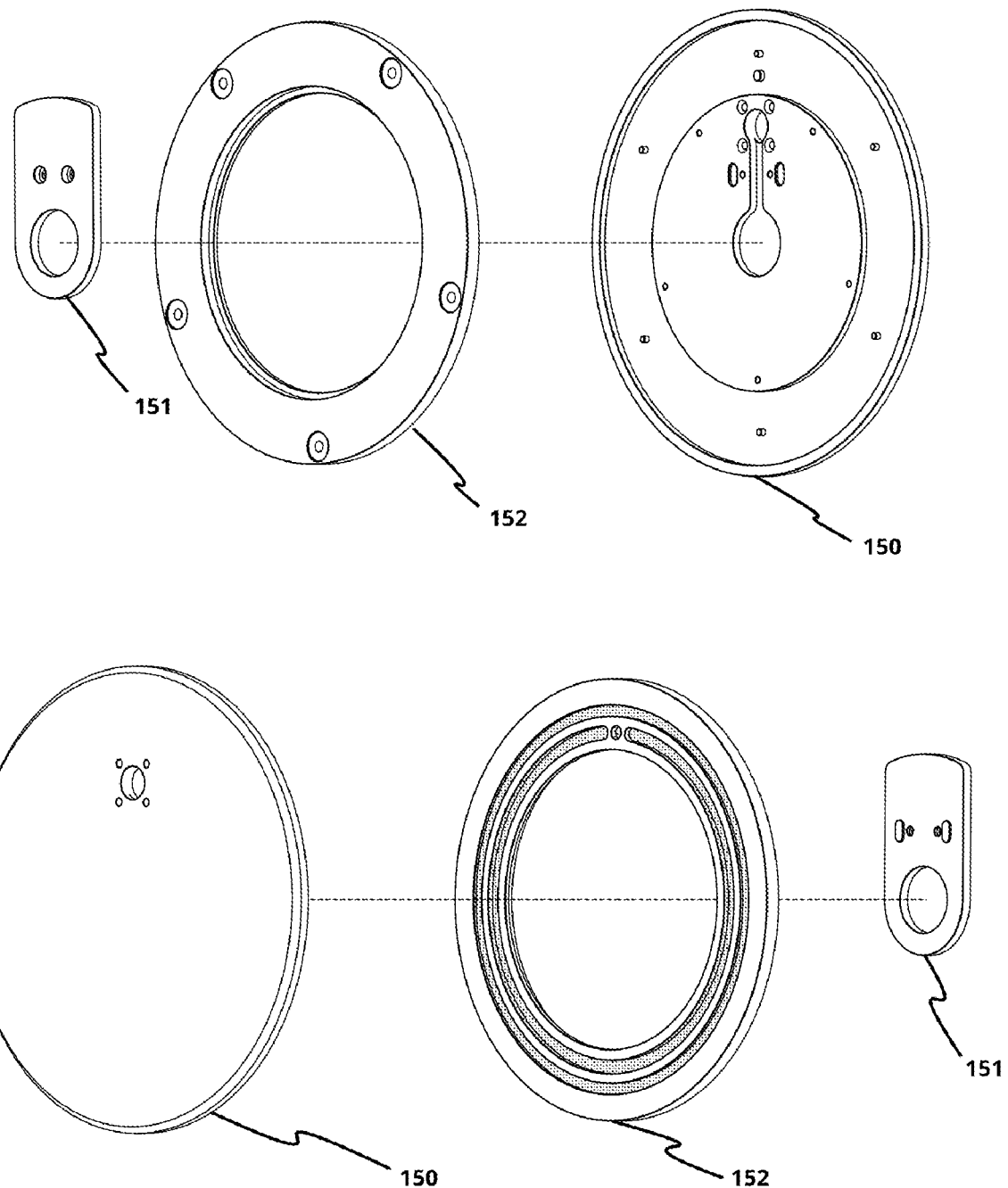
FIG. 20 is a diagram showing a front and back perspective exploded view of an example rotary add-on assembly in accordance with some implementations.

FIG. 20 shows the exploded, unassembled view of the rotary add-on assembly, consisting of the rotating top piece (150), wire management guide piece (151), and fixed Base Piece (152).

Figure 21:
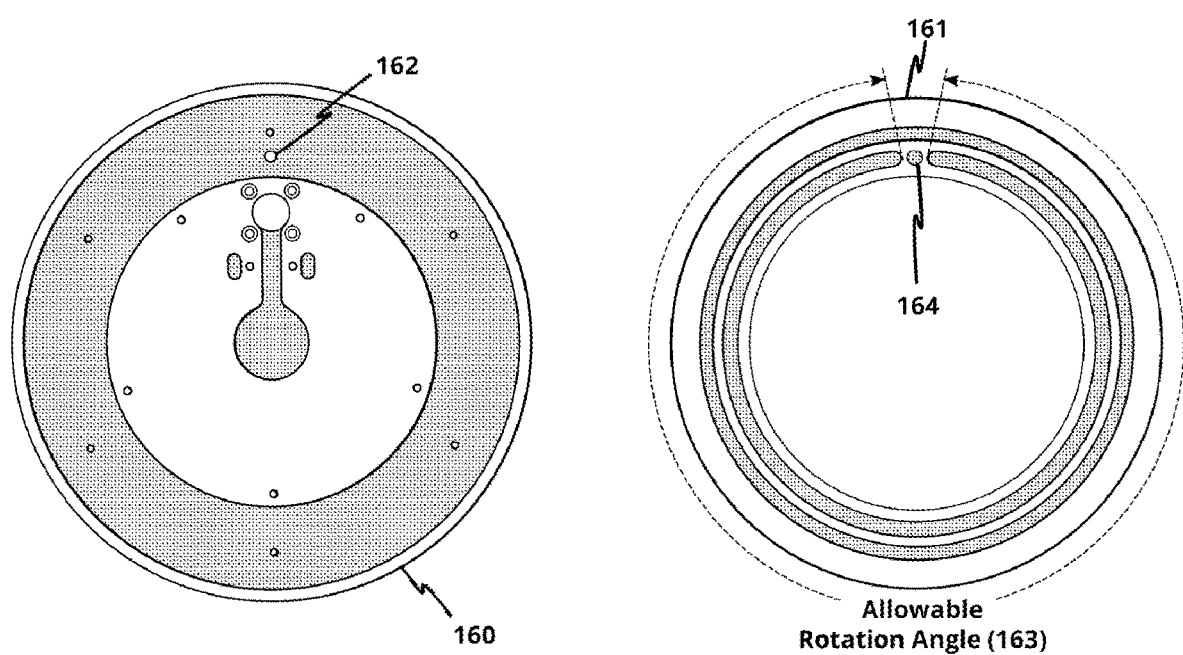
FIG. 21 is a diagram showing a detailed view of an example rotary add-on assembly in accordance with some implementations.

FIG. 21 shows how the rotating top piece (160) can be placed coaxially with the fixed Base Piece (161). Due to the geometry of these parts, the protruding stop (162) built into the rotating top piece can permit these two parts to freely rotate with respect to each other and be limited to rotate within less than 1 full rotation—(e.g., less than 360°) (163), so as to not cause twisting damage to installed wiring. Alternatively, the geometry of the rotating top piece can also be configured to prevent any rotation whatsoever at installation time, by directly assembling the protruding stop (162) built into the rotating top piece (160) into its matching rotation stop slot (164) of the rotating top piece, which has been sized to match the protruding stop's diameter, thus preventing any motion.

Figure 22:
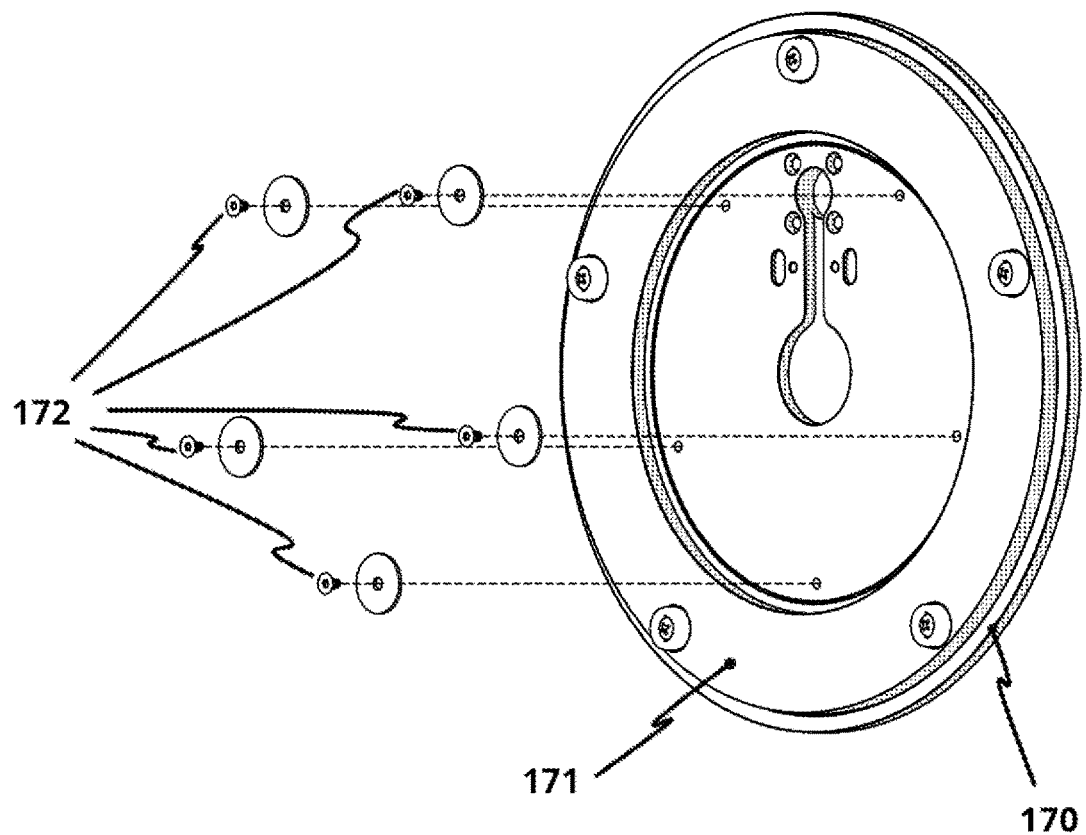
FIG. 22 is a diagram showing a perspective view of an example rotary add-on assembly being assembled in accordance with some implementations.

FIG. 22 shows the rotating top piece (170) retaining the fixed Base Piece (171) into a partially constrained position, using a series of screws and washers (172). These two parts can only rotate about each other coaxially, if the protruding stop is not placed into its matching rotation stop slot. When assembled together, these two parts form the Base Piece assembly.

Figure 23:
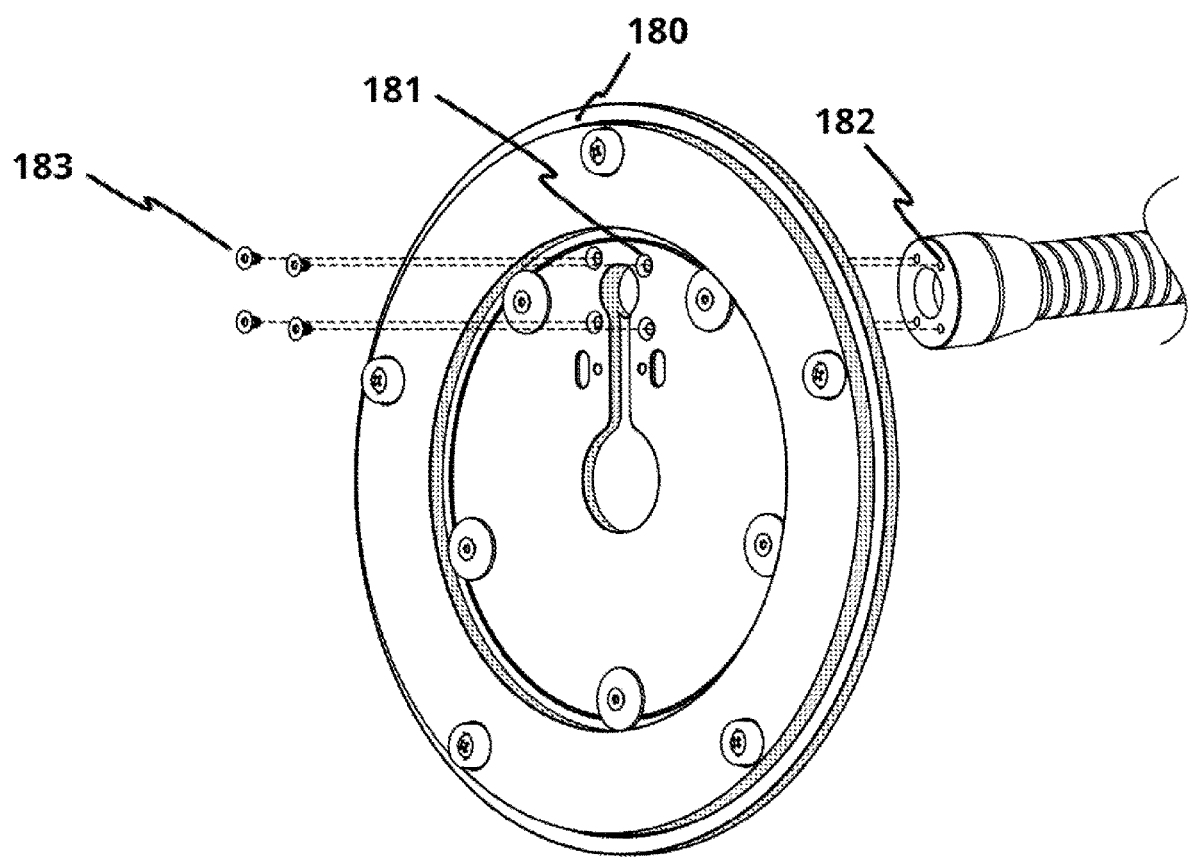
FIG. 23 is a diagram showing a perspective view of an example rotary add-on assembly being installed in accordance with some implementations.

FIG. 23 shows the Base Piece assembly (180) and how its screw hole mounting pattern geometry (181) of the matches that of the hollow stem's termination piece's screw hole mounting pattern (182), which permit it to be fastened together securely using screws or other fasteners (183).

Figure 24:
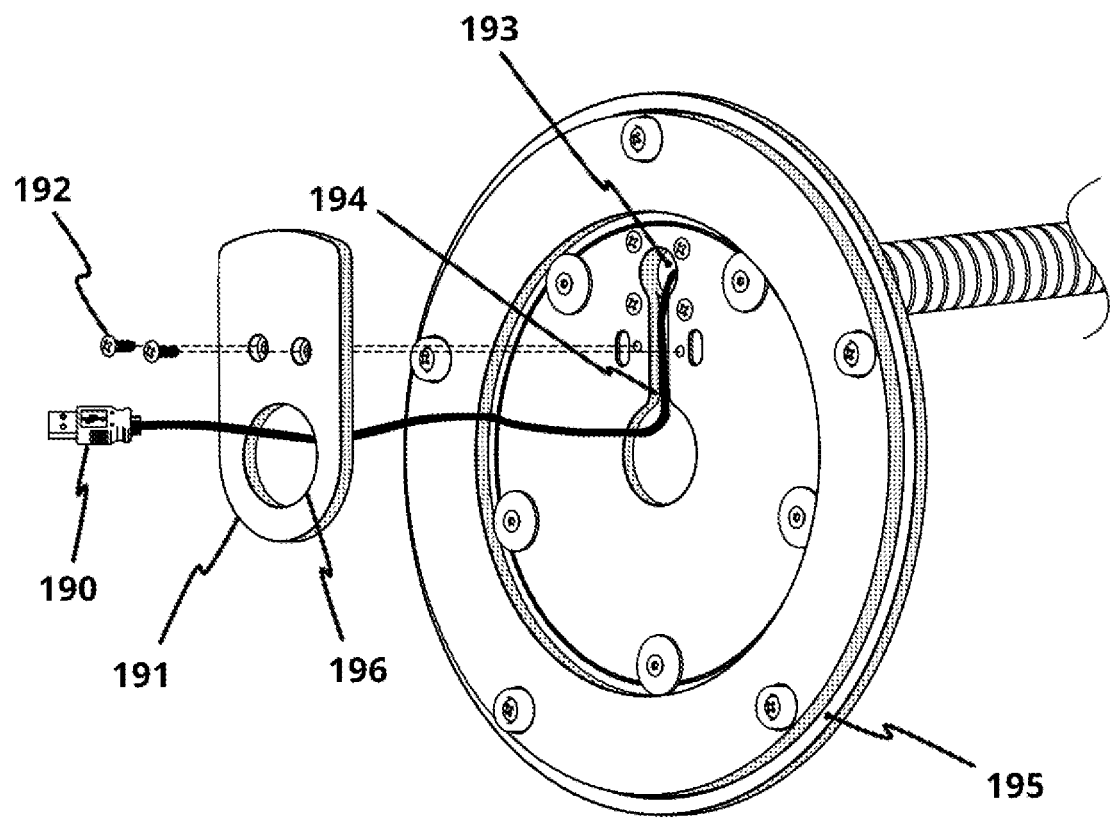
FIG. 24 is a diagram showing a perspective view of an example rotary add-on assembly with a wire management guide piece being installed in accordance with some implementations.

FIG. 24 shows how an installed cable (190) can be routed by the wire management guide piece (191), which is secured onto the Base Piece assembly using screws or other fasteners (192). A cable coming from the exit hole of the hollow stem's termination piece (193) can be led into the radial channel (194) built into the rotating top piece (195), then guided out of the centered exit hole (196) on the wire management guide piece. This permits the connected wiring to be completely hidden and remain damage-free, while the parts are permitted to freely rotate coaxially.

The figures included herein demonstrate some of the many possible and various form factors or sizes that the disclosed subject matter can be in. In these variants, an implementation of the disclosed subject matter can be directly flush mounted onto any flat surface, left loose for portability of the assembly, or have an add-on included to permit for lateral rotation. To secure the assembly, the Kensington Lock Slot can be utilized to prevent unauthorized removal, or it can be mounted permanently onto any wall or desktop surface to ensure theft deterrence. In some implementations, the modular designs permit other add-ons to be placed for additional functionality, and the descriptions and figured shown herein simply show some examples of possible configurations but should not be construed as a limit on potential embodiments.

VARIATIONS

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles permit for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

The breadth of the disclosed subject matter is not to be limited to the examples provided and/or the subject specification, but rather only by the scope of the claim language. Use of the term "disclosed subject matter" herein is not intended to limit the scope of the claims in any manner. Rather it should be recognized that the "disclosed subject matter" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field, etc.) be accorded special significance in describing the disclosed subject matter relative to another or the claims. The references cited herein are incorporated by reference in their entirety. Although the foregoing disclosed subject matter has been described in detail for purposes of clarity of understanding, it is contemplated that certain modifications may be practiced within the scope of the claims.

What is claimed is:

1. A surface VESA bracket support comprising:
   a hollow center column having a first end and a second end each end having a recessed attachment plate, wherein the recessed attachment plate includes a large aperture and a plurality of small apertures, and wherein each of the plurality of small apertures are constructed to receive fasteners;
   a VESA Plate having a first plurality of plate apertures that correspond to the small apertures on the hollow center column ends, wherein the plate apertures are configured to each receive a fastener passing through a respective plate aperture and into a corresponding small aperture in the recessed attachment plate on the first end of the hollow center column to fasten the VESA plate to the hollow center column, and wherein the VESA Plate includes a slot formed in a center of the VESA plate and configured to permit cables to pass through the slot and into the hollow center column; and
   a base plate having a plurality of small apertures, wherein the plurality of small apertures configured for fastening to the second end of the hollow center column opposite the end to which the VESA plate is attached.

2. The surface bracket support of claim 1, wherein the hollow center column is made of a flexible coil material.

3. The surface bracket support of claim 1, further comprising a lock bracket having a lock slot.

4. The surface bracket support of claim 1, further comprising semi-circular slot formed on the base plate.

5. The surface bracket support of claim 1, further comprising an adapter bracket constructed for fastening to the second end of the hollow center column configured for a direct top mount configuration that does not include a base plate.

6. The surface bracket support of claim 1, further comprising an adapter bracket having an aperture to permit wiring to pass through the adapter bracket, wherein the adapter bracket is attached to the second end from behind the mounting surface via fasteners passing through the mounting surface, and wherein the adapter bracket acts as a washer.

7. The surface bracket support of claim 1, further comprising a cover cap configured to fit over the base plate.

8. The surface bracket support of claim 1, further comprising a grommet including one or more pieces.

9. The surface bracket support of claim 1, further comprising a rotary add-on assembly.

10. The surface bracket support of claim 1, further comprising a wire management guide piece to permit connected wiring to be hidden and to reduce damage, while a portion of the rotary add-on assembly is permitted to freely rotate coaxially.

11. The surface bracket support of claim 1, wherein the surface bracket support is made of one or more of plastic, metal, stone, wood, natural, synthetic, or composite material.

* * * * *